(12) United States Patent
Sobhani et al.

(10) Patent No.: US 11,516,089 B2
(45) Date of Patent: Nov. 29, 2022

(54) METHODS AND SYSTEMS FOR NETWORK VERIFICATION USING HIERARCHY-BASED MODEL

(71) Applicants: Ashkan Sobhani, Kanata (CA); Xingjun Chu, Ottawa (CA)

(72) Inventors: Ashkan Sobhani, Kanata (CA); Xingjun Chu, Ottawa (CA)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 0 days.

(21) Appl. No.: 17/080,112

(22) Filed: Oct. 26, 2020

(65) Prior Publication Data

US 2022/0131760 A1   Apr. 28, 2022

(51) Int. Cl.
*H04L 41/142*   (2022.01)
*H04L 41/14*   (2022.01)
*H04L 41/147*   (2022.01)

(52) U.S. Cl.
CPC .......... *H04L 41/142* (2013.01); *H04L 41/145* (2013.01); *H04L 41/147* (2013.01)

(58) Field of Classification Search
CPC .... H04L 41/142; H04L 41/145; H04L 41/147
See application file for complete search history.

(56) References Cited

U.S. PATENT DOCUMENTS

| | | | | |
|---|---|---|---|---|
| 8,078,642 | B1 * | 12/2011 | Poutanen | G06F 16/9027 707/706 |
| 2019/0327337 | A1 * | 10/2019 | Azgin | H04L 45/64 |
| 2020/0028762 | A1 * | 1/2020 | Sun | H04L 43/04 |

FOREIGN PATENT DOCUMENTS

| | | |
|---|---|---|
| CN | 106503368 A | 3/2017 |
| CN | 108521344 A | 9/2018 |
| CN | 110521169 A | 11/2019 |
| CN | 110958157 A | 4/2020 |
| WO | 2018195025 A1 | 10/2018 |

OTHER PUBLICATIONS

Li, Y et al., "A Survey on Network Verification and Testing With Formal Methods: Approaches and Challenges", IEEE Communications Surveys & Tutorials, vol. 21, No. 1, pp. 940-969, 2019.
Steffen, S. et al., "Probabilistic Verification of Network Configurations", SIGCOMM '20, Aug. 10-14, 2020, Virtual Event, NY, USA, pp. 750-764.

* cited by examiner

*Primary Examiner* — John A Follansbee
*Assistant Examiner* — Fadi Haj Said

(57) ABSTRACT

Methods and systems for network verification are described. An input binary decision diagram (BDD) is defined to represent an input header space to query for a network property of interest. The input BDD is provided as input to a device-level BDD representing a source device in a logical topology representing connections among devices of the network. Each device in the network is represented by a respective device-level BDD in the logical topology. An output BDD is calculated, representing an output header space outputted by a destination device in the logical topology. The output BDD is calculated by sequentially applying, to the input BDD, each device-level BDD in a logical path from the source device to the destination device. The output BDD is then reported, and the reported output BDD is compared with an expected output BDD, to verify the network property of interest.

20 Claims, 10 Drawing Sheets

METHODS AND SYSTEMS FOR NETWORK VERIFICATION USING HIERARCHY-BASED MODEL

RELATED APPLICATIONS

This is the first patent application for the present disclosure.

FIELD

The present disclosure is related to methods and systems for network verification, including methods and systems for network verification using a hierarchy-based model, and binary decision diagrams.

BACKGROUND

As networks and the operations of network devices have been become more complicated, it has become increasingly difficult for network operators to ensure that network configurations and policies are designed and installed in accordance with the desired intentions. Moreover, considering the size of many existing networks, using traditional network testing tools (e.g., simple network management protocol (SNMP), or tracing tools such as tracert or ping) provides limited coverage of the network. Further, such network tracing techniques are used to reactively diagnose problematic issues after these issues have occurred.

To address some of the aforementioned complications and limitations, formal verification techniques which have been previously used in software and chip design have been considered for use in verification of a network. The term "formal" refers to the use of mathematical models and calculations to verify network configuration, in place of tracking a network by sending actual data packets. Formal network verification may be referred to simply as network verification, in the context of the present disclosure. Network verification provides proactive and predictive identification of problematic issues. However, practical application of network verification still faces challenges in terms of scalability and real-time verification.

Typically, in network verification, the network to be verified is modeled using mathematical techniques, and then the desired invariants of the network are checked in the model to specify the correct behavior of the network. Examples of existing network verification techniques can be classified into four categories including model checking, theorem proving, Boolean satisfiability (SAT)/satisfiability modulo theory (SMT) solver, symbolic execution and symbolic simulation. However, such existing techniques have drawbacks such as being slow to execute, being limited in application, or requiring excessive computing power.

Thus, there is a need for improved techniques for network verification.

SUMMARY

In various examples, the present disclosure describes methods and systems for network verification that help to address some of the drawbacks of existing network verification techniques.

In the disclosed methods and systems, all network entities residing in a network device are taken into consideration in an aggregated model of the network device. This approach may help to reduce or eliminate the problem of state explosion (a problem in which as the number of state variables, the size of the system state space grows exponentially).

The disclosed methods and systems also use hierarchy-based models for verification, each hierarchy providing information in a different level of granularity. If a problem is detected when a higher level model is processed, the location of the fault can be specified by performing another processing at a lower level and smaller scope of the model. This approach enables the source of the detected problem to be located with greater specificity.

In some example aspects, the present disclosure describes a method for verification of a network. The method includes: providing an input binary decision diagram (BDD) as input to a device-level BDD representing a source device in a logical topology representing connections among devices of the network, the input BDD representing an input header space to query for a network property of interest, each device in the network being represented by a respective device-level BDD in the logical topology; calculating an output BDD representing an output header space outputted by a destination device in the logical topology, wherein the output BDD is calculated by sequentially applying, to the input BDD, each device-level BDD in a logical path from the source device to the destination device; reporting the output BDD; and comparing the reported output BDD to an expected output BDD, to verify the network property of interest.

In any of the above examples, each device may be represented by a respective hierarchy-based model. The hierarchy-based model may include a device-level corresponding to the respective device-level BDD, the hierarchy-based model may further include at least another hierarchy level, lower than the device-level, corresponding to one or more lower level BDDs representing respective one or more lower level model entities of the respective device.

In any of the above examples, the one or more model entities may include one or more network entities (NEs) residing on the respective device, and each NE may be represented by a respective NE-level BDD at a NE-level that is lower than the device-level in the hierarchy-based model.

In any of the above examples, the hierarchy-based model may further include a rule-level that is lower than the NE-level in the hierarchy-based model, the rule-level corresponding to one or more rule-level BDDs representing respective one or more rules implemented by the one or more NEs.

In any of the above examples, each lower level BDD may be conjugated with a respective index variable indicating a logical order of the respective model entity in a logical path from an ingress to an egress of the respective device.

In any of the above examples, the method may include: detecting, from the reported output BDD, a fault in the network at an identified faulty device; and performing a lower level verification using the hierarchy-based model representing the identified faulty device by: providing the input BDD as input to the one or more lower level BDDs in the hierarchy-based model; calculating an output BDD from each lower level BDD; and identifying, from the calculated output BDD, a faulty lower level model entity of the identified faulty device.

In any of the above examples, the lower level verification may be repeated for each successively lower level of the hierarchy-based model.

In any of the above examples, the method may include: generating the device-level BDD for a given device by: collecting data about device states and device configurations, the collected data including data about one or more model entities implemented by the given device; modeling each model entity as a respective Boolean function and encoding the respective Boolean function as a respective BDD; logically combining the respective BDDs representing the one or more model entities within the given device; and storing the logical combination as the device-level BDD representing the given device.

In any of the above examples, each device may be represented by a respective hierarchy-based model. The hierarchy-based model may include a device-level corresponding to the respective device-level BDD, the hierarchy-based model may further include at least another hierarchy level, lower than the device-level, corresponding to one or more lower level BDDs representing respective one or more model entities implemented by the respective device. The method may include: generating the hierarchy-based model for a given device by: collecting data about device states and device configurations, the collected data including data about the one or more lower level model entities implemented by the given device; modeling each model entity corresponding to a lowest level of the hierarchy-based model as a respective Boolean function and encoding the respective Boolean function as a respective BDD; generating BDDs for each successively higher level of the hierarchy-based model by, for a given hierarchy level: generating a BDD representing a given model entity at the given hierarchy level by logically combining BDDs representing one or more lower level model entities implemented by the given model entity, the one or more lower level model entities belonging to a lower hierarchy level immediately below the given hierarchy level; wherein each BDD representing a respective lower level model entity is conjugated with a respective index variable indicating a logical order of the respective lower level model entity implemented by the given model entity; and storing the BDDs for each hierarchy level.

In some example aspects, the present disclosure describes a computing system for verification of a network. The computing system includes: a processor device; and a memory storing instructions. The instructions, when executed by the processor device, cause the computing system to: provide an input binary decision diagram (BDD) as input to a device-level BDD representing a source device in a logical topology representing connections among devices of the network, the input BDD representing an input header space to query for a network property of interest, each device in the network being represented by a respective device-level BDD in the logical topology; calculate an output BDD representing an output header space outputted by a destination device in the logical topology, wherein the output BDD is calculated by sequentially applying, to the input BDD, each device-level BDD in a logical path from the source device to the destination device; report the output BDD; and compare the reported output BDD to an expected output BDD, to verify the network property of interest.

In any example of the computing system, the instructions may cause the computing system to perform any of the example methods described above.

In some example aspects, the present disclosure describes a computer-readable medium having instructions stored thereon. The instructions, when executed by a processor device of a computing system, cause the computing system to: provide the an input binary decision diagram (BDD) as input to a device-level BDD representing a source device in a logical topology representing connections among devices of a network, the input BDD representing an input header space to query for a network property of interest, each device in the network being represented by a respective device-level BDD in the logical topology; calculate an output BDD representing an output header space outputted by a destination device in the logical topology, wherein the output BDD is calculated by sequentially applying, to the input BDD, each device-level BDD in a logical path from the source device to the destination device; report the output BDD; and compare the reported output BDD to an expected output BDD, to verify the network property of interest.

In any examples of the computer-readable medium, the instructions may further cause the computing system to perform any of the example methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
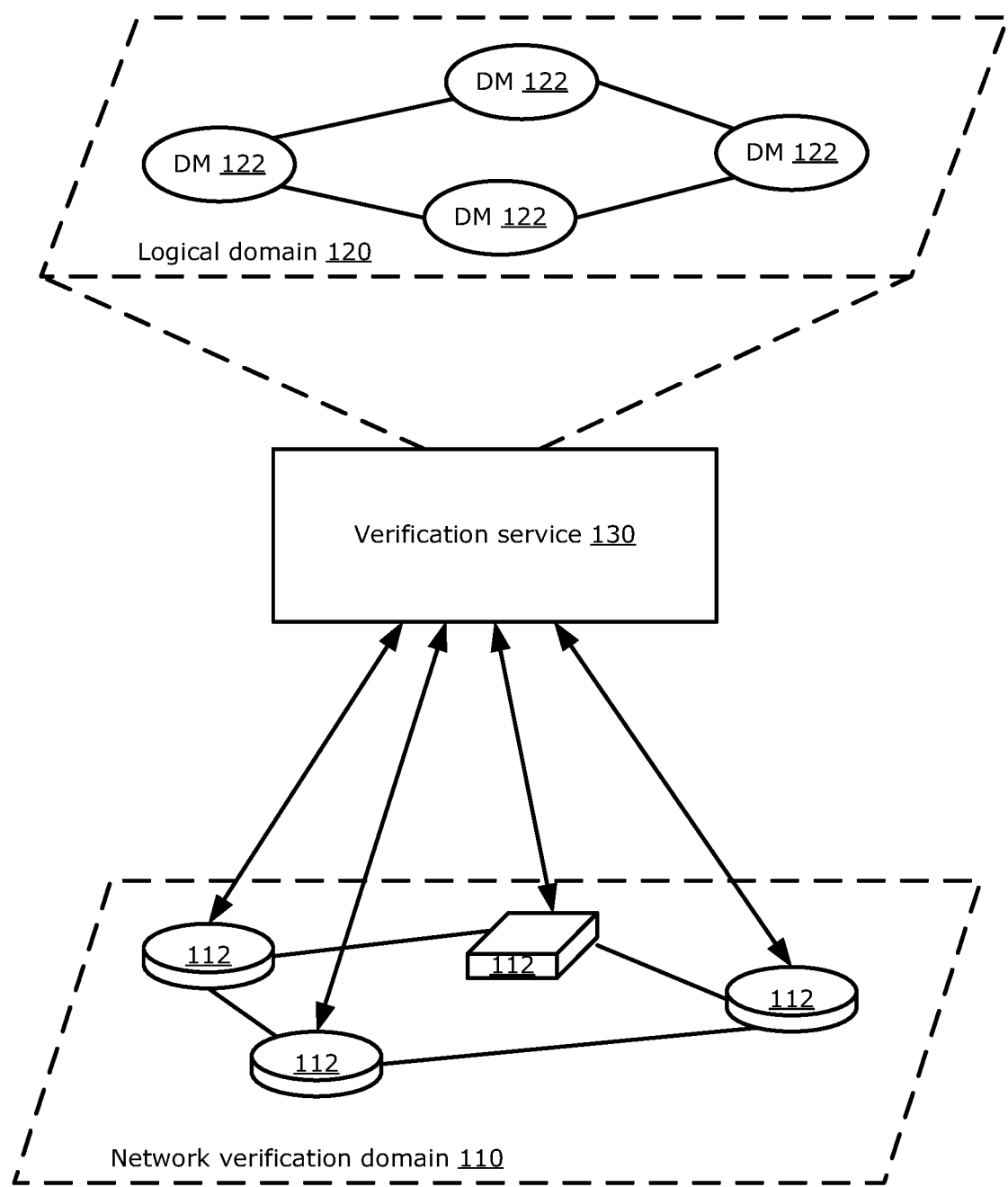
FIG. 1 illustrates an example verification architecture that may be used to implement examples of the present disclosure.

As used herein, the term "computer network" refers to a set of computing devices or electronic communication devices in communication with one another using one or more standardized digital communication protocols. The communications may take place over any type of wired or wireless digital communication link, or combinations thereof. The devices may be routers, switches, computers such as servers or personal computers, mobile devices such as smartphones, Internet of Things (IoT) devices, or any other devices capable of transmitting, receiving, and/or routing communications via a digital communication network. Whereas some examples are described herein with reference to computer networks, it will be appreciated that the methods, systems, and media described herein may be applicable to systems other than computer networks that may use Boolean functions or binary decision diagrams (BDDs) to represent systems states.

As used herein, the term "network entity" (NE) refers to a data structure or set of rules applied by a device in a computer network to determine how a communication in the network is treated, on the basis of the values of various data fields (also called simply "fields") present in the communication. A NE may therefore be represented as a table that may be used to determine whether the values of the fields of a communication (such as a digital data packet) satisfy various criteria, and to thereby determine how the communication is to be treated (e.g., forwarded to a specific device or port, translated, accepted, or rejected). NEs may include access control lists (ACL), MAC address tables, IP address tables, NAT tables, and so on. It will be appreciated that any set of rules used by switches, routers, or other network devices to determine treatment of a data packet, and therefore may affect how a network treats a given communication, may potentially be represented as a NE.

As used herein, a "field" refers to a data field. A communication (such as a data packet) may specify values for one or more fields, and NEs may specify one or more values or ranges of values for the field as part of a rule determining treatment of the communication. Examples of common fields used in computer networks include IP address, MAC address, and port number.

To assist in understanding the present disclosure, some known verification tools and their drawbacks are first discussed.

One network verification tool is the open source network analysis tool Batfish. This tool simulates the control-plane to obtain the forwarding rules (FIB). The results is that this tool tends to be very slow to execute, for example requiring hours for verification of a relatively small network. Another existing network verification tool is Minesweeper. Because this tool is designed based on satisfiability module theory (SMT), it cannot provide more than one counterexample when a violation occurs. Another existing network verification tool is Veriflow, which is an enhanced version of another tool known as Anteater. Veriflow extracts equivalent classes for the whole network, however performing such a task can be difficult or impossible for a network composed of different segments controlled in different administration domains. Moreover, computing equivalent classes may be challenging or resource-intensive for large-scale networks. NetPlumber is another existing verification tool, which takes an approach similar to Veriflow. NetPlumber verifies only the parts of the network which are impacted by a change in network rules, and does not verify the entire network.

Another existing network verification tool is referred to as Hassel-C (or HSA). This tool encodes pack headers as subsets of geometric space. The drawback of this approach is that HSA suffers from state space explosion in the case of a large number of required bits of header space. Network Optimized Datalog (NOD) is another existing verification tool that is similar to HSS, but using a different encoding technique. NOD has been reported to have slow performance.

Some conventional network verification tools use a model checking approach. In model checking, a single large model is built for the entire network, for example even the location of packets is represented in a finite state machine (FSM) embedded in a single network model. The conventional model checking approach has the benefit of being faster to calculate, because there is only one model to consider for the entire network. However, a drawback is a lack of details about the location or cause of a detected fault in the network. An example of the model checking approach is Flow-Checker. FlowChecker uses model checking to verify the correctness of Open Flow networks. However, FlowChecker has been found to suffer from scalability problems and may be limited to practical application in relatively small networks.

Some conventional network verification tools use a symbolic execution or symbolic simulation approach. HSA, for example, is based on symbolic execution. In symbolic execution, all possible executions of a system are determined by inputting different possible values of a symbolic variable into the system and evaluating the resulting output from the system. Symbolic simulation uses a similar technique, but applied to a simulated model of the system rather than the real-world system. The symbolic simulation approach provides any desired level of detail for simulating the network execution, however there is a problem of state space explosion when the network is large and/or the network is modeled to a high level of detail.

The present disclosure describes methods and systems that help to reduce the state explosion problem, without losing information about the source of a fault in the network. The disclosed methods and systems may provide the advantages of both model checking and symbolic execution, without suffering all the drawbacks of such approaches.

In the disclosed methods and systems, verification models represent individual NEs. In the verification process as disclosed herein, the header space is considered as a symbolic variable (based on the approach used in symbolic simulation), and this variable passed through a path in the network. The network can be modeled without losing any verification context, and without having to build a large model which can lead to the state explosion problem. The disclosed methods and systems may thus increase scalability for verifying large networks.

The disclosed methods and systems may also enable the source of a fault to be more precisely located. Some existing verification techniques verify the network as a whole, or at best just provide counterexamples for which the desired invariant is not true. However, the context embedded in the counterexample is typically not enough to pinpoint the source of a problem. The disclosed methods and systems makes use of a hierarchal model, and uses a multi-scan verification process which enables more precision in identifying the source of a fault in the network.

FIG. 1 shows a simple example of the verification architecture 100 that may be used to implement examples described herein. The disclosed verification architecture 100 includes a Network Verification Domain (NVD) 110, a Verification Service (VS) 130, and Device Models (DMs) 122 in a logical domain 120 generated by the VS 130.

The NVD 110 refers to the actual network to be verified, and contains all the network devices that are to be verified as part of the network. A network device 112 within the NVD 110 may be any device that participate in communication of packets in a network. For example, each network device 112 may independently be one of: a router, a switch, a gateway, or any other network-enabled device, among other possibilities. Typically, the behavior of a network is modeled on the basis of network devices 112 used for managing network traffic, such as routers, switches, servers, firewalls, and so on.

Each network device 112 is modeled by building a respective corresponding DM 122. The DM 122 that models a given network device 112 is designed to represent the functional behavior of the network device 112 according to verification requirements. For instance, for data-plane verification, each DM 122 represents the behavior of the corresponding network device 112 in the data-plane. On the other hand, for control mechanism verification, each DM 122 represents the behavior of the corresponding network device 112 in terms of running routing protocols and route-policies. Each DM 122 is represented as a Boolean function, which is encoded as a BDD, for example as a reduced ordered BDD (ROBDD). It should be understood that references to a BDD in the present disclosure may more specifically be a reference to a ROBDD.

A BDD is a data structure that is used to represent a Boolean function. A BDD can be represented as a binary decision tree consisting of a top node, below which are one or more binary decision sub-trees that recursively follow the same pattern. A BDD can be used to model decisions made by a corresponding network device 112 (i.e., the network device 112 being modeled by the DM 122 that is in turn represented by the Boolean function that is encoded as the BDD) with regard to specific communications made via the network in the NVD 110. For example, a digital data packet sent in the NVD 110 may include one or more fields (e.g., an internet protocol (IP) address, a port number, and a media access control (MAC) address) that is used by a network device 112 to decide how that packet should be treated (e.g., forwarded to a specific other device, refused, granted access). The network device 112 may make this decision using one or more NEs (e.g., access control lists (ACL), MAC address tables, network address translation (NAT) tables, forwarding information base (FIB), routing policy, protocol configurations, etc.) hosted on the network device 112. Each NE may be represented by a Boolean function that can be modeled using a respective BDD. As will be described further below, the network device 112 may be modeled based on the BDDs of the NEs hosted on the network device 112.

A ROBDD is a reduced form of BDD, in which any isomorphic subgraphs have been merged, and any nodes having two isomorphic child nodes are removed. A ROBDD is a unique representation of a Boolean function. Often, common usage of the term BDD is intended to refer to ROBDD specifically.

The VS 130 performs operations for collecting data from network devices 112, generating verification models, and performing the network verification. Further details about the operation of the VS 130 will be discussed further below.

Figure 2:
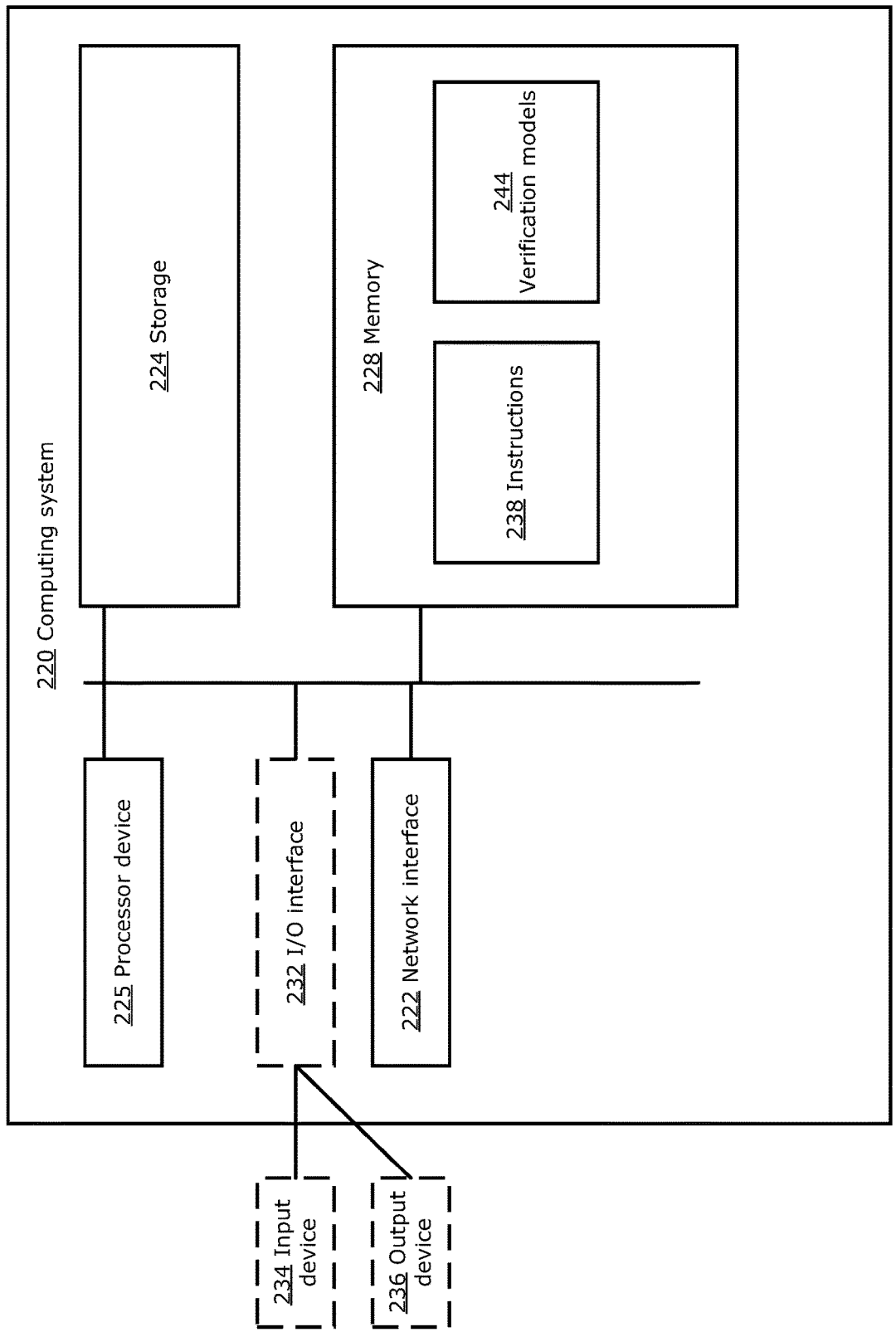
FIG. 2 is a block diagram illustrating a simplified example of a computing system, which may be used to implement examples of the present disclosure.

FIG. 2 is a block diagram illustrating a simplified example of a computing system 220, such as a server, a computer or a cloud computing platform, suitable for carrying out examples described herein. For example, the VS 130 may be implemented using the computing system 220. Other examples suitable for implementing embodiments described in the present disclosure may be used, which may include components different from those discussed below. Although FIG. 2 shows a single instance of each component, there may be multiple instances of each component in the computing system 220.

The computing system 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The computing system 220 may also include one or more optional input/output (I/O) interfaces 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the system 220. In other examples, there may not be any input device(s) 234 and output device(s) 236, in which case the I/O interface(s) 232 may not be needed.

The computing system 220 may include one or more network interfaces 222 for wired or wireless communication with one or more devices or systems of a network, such as the network devices 112 in the NVD 110 being modeled by the methods described herein. The network interface(s) 222 may include wired links (e.g., Ethernet cable) and/or wireless links (e.g., one or more antennas) for intra-network and/or inter-network communications.

The computing system 220 may also include one or more storage units 224, which may include a mass storage unit such as a solid state drive, a hard disk drive, a magnetic disk drive and/or an optical disk drive.

The computing system 220 may include one or more memories 228, which may include a volatile or non-volatile memory (e.g., a flash memory, a random access memory (RAM), and/or a read-only memory (ROM)). The non-transitory memory(ies) 228 may store instructions 238 for execution by the processor device(s) 225, such as to carry out examples described in the present disclosure. In some examples, the memory(ies) 228 may include software instructions 238 for execution by the processor device 225 to implement the model generation and network verification as disclosed herein. The software instructions 238 may also include other instructions, such as for implementing an operating system and other applications/functions.

The non-transitory memory(ies) 228 may also store verification models 244 that have been generated. The stored verification models 244 may include DMs 122 as well as models at different levels of granularity (e.g., models of an entire network and/or models of individual NEs). In some examples, such as where the verification models 244 require memory to store, some or all of the verification models 244 may instead by stored in an external memory (e.g., an external database, or on cloud-based storage) accessible by the computing system 220.

In some examples, the computing system 220 may additionally or alternatively execute instructions from an external memory (e.g., an external drive in wired or wireless communication with the computing system 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

It will be appreciated that various components and operations described herein can be implemented on multiple separate devices or systems in some embodiments.

Reference is again made to FIG. 1. When network verification is first enabled, the NVD 110 and desired one or more verification invariants may be defined in the VS 130. The VS 130 may first collect data from all network devices 112 in the NVD 110 in order to build the DMs 122 for all the network devices 112. Each network device 112 may first register itself with the VS 130. Then, according to the defined NVD 110 and the desired verification invariants, the VS 130 collects, from all the network devices 112 belonging to the NVD 110 (as defined in the NVD definition), all the relevant device states and device configurations. This phase may be referred to as the data collection phase. The data collection may be initially triggered by the VS 130 when network verification is initialized. Subsequently, each network device 112 registered on the VS 130 may unilaterally send unsolicited data to the VS 130. For example, a network device 112 may transmit data to the VS 130 if there has been any changes in the device state or configuration.

After sufficient data has been collected from the network devices 112, the VS 130 builds the DMs for all network devices 112. Further details of model generation will be described further below. As illustrated in FIG. 1, the VS 130 creates a logical topology in the logical domain 120 among the DMs 122 based on the defined verification invariant(s). It should be noted that the logical topology in the logical domain 120 does not necessarily match the physical topology among network devices 112 in the NVD 110. For example, if a verification invariant is reachability (ability for each network device to receive communications such as packets) on an overlay network on top of the physical network, the logical topology may be generated by the VS 130 based on the connections (or tunnels) among network devices 112 on the overlay network. After generation of the logical topology and DMs 122, the VS 130 may perform verification of the network.

In formal verification, each DM 122 is generated based on the configuration and state of the corresponding network device 112. In particular, the DM 122 is generated to represent how the corresponding network device 112 behaves with respect to a particular network property to be verified, as discussed further below. Verification is then performed by inputting a header space into a source DM 122, calculating the output header space at a destination DM 122, and determining whether the desired verification property is satisfied. Some network properties that may be verified using the DMs 122 include reachability (e.g., whether there are any network devices 112 that cannot be reached by a packet), loop detection (e.g., whether any packets end up back at the source device 112), presence of black holes (e.g., whether there is any device 112 that drops packets), route detection (e.g., to map routes from a source device 112 to a destination device 112), and security breach (e.g., whether a firewall provided by a network device 112 is correctly operating), among others. The DMs 122 may be generated only for network devices 112 (and network entities within network devices 112) that are relevant to the network property of interest.

A header space is a technique to model packets communicated in the network. First, it should be understood that the processing of packets in a network is mostly concerned with information contained in the packet header rather than information contained in the payload. Each network device 112 processes a packet by processing header fields that are encoded as some sequence of binary values (i.e., a sequence of "1" or "0" header bits). Accordingly, for the purpose of verification, a packet can be modeled as a packet header that is a point in $[0, 1, *]^L$ space, where L is the length of the packet header, and * is a "wildcard" value that can be "1" or "0". The header space is thus the space of all possible packet headers of length L, and is used to represent a set of possible packets rather than a single packet.

As an input header space travels a logical path from the source DM 122 to the destination DM 122, each model encountered by the header space applies a Boolean function to the header space, which represents how the corresponding NE processes the header space (e.g., send to which output port, if the network is being verified for a reachability property). Then the output header space can be used to verify whether the desired verification property is satisfied, using header space calculations (which is well-known and will not be described in detail here).

An example of the verification process performed by the VS 130 is first described with reference to FIGS. 3 and 4.

Figure 3:
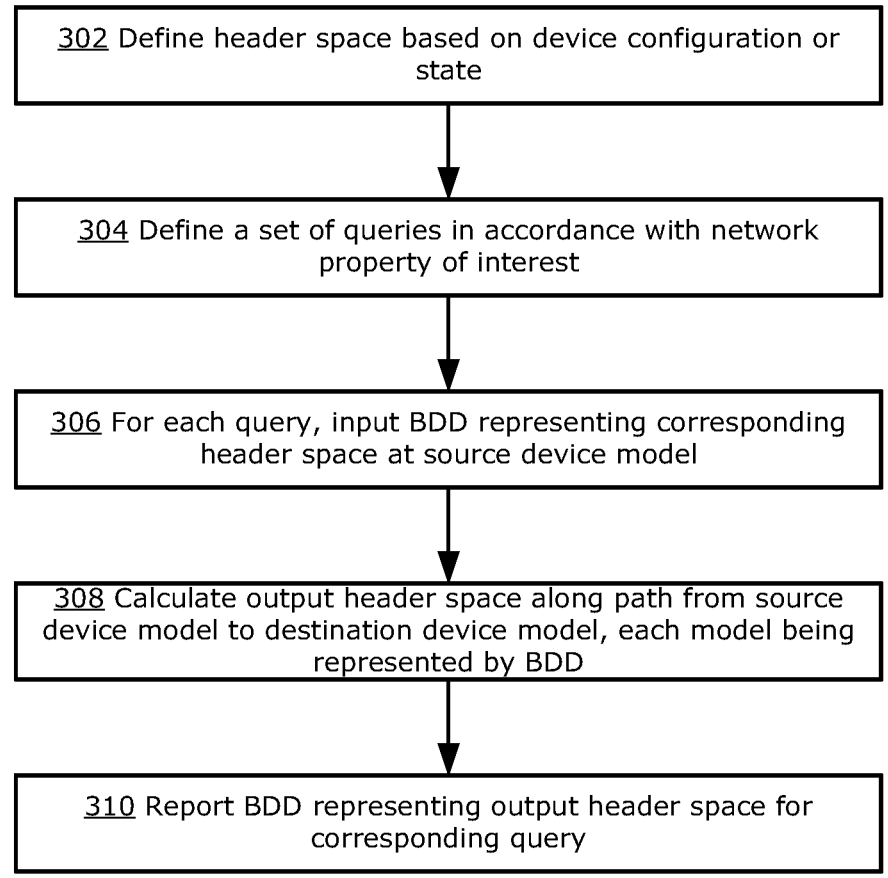
FIG. 3 is a flowchart illustrating an example method for network verification, in accordance with examples described herein.

FIG. 3 is a flowchart illustrating an example method 300 for network verification, which is performed by the VS 130 (e.g., implemented by the computing system 220, by the processor device 225 executing instructions 238).

At 302, a header space is defined by the VS 130. The header space is used as input for performing the verification, and can be considered as a symbolic variable. The VS 130 may generate the header space by detecting the configuration of network devices 112 that interface with other entities outside the NVD 110 (e.g., that interface with devices that are not part of the network being verified). The header space may be defined using information extracted from the configuration or state of each network device 112 (e.g., based on device configuration data such as whether there is a local attached LAN, static routes, etc.). For example, if a given network device 112 is (or includes) a border router that interfaces with other entities outside of the NVD 110, and the given network device 112 has an IP address of 192.168.10.10/24, then the VS 130 may define the header space to be a symbolic variable representing the space of all possible packet headers that would be received at this IP address. In this particular example, the header space may be defined as (11000000, 10101000, 00001010, ******), which is the binary representation of 192.168.10.** (where * is a wildcard that can be any binary value). In some examples, the header space may be configured by an operator of the VS 130.

At 304, the VS 130 defines a set of one or more queries in accordance with the network property of interest that is to be verified. For example, if the network property of interest is reachability of all interfaces connecting the NVD 110 to entities outside of the NVD 110, then the VS 130 may first identify and obtain the configuration information of all border devices 112 in the NVD 110 that interface with outside of the NVD 110, then define queries in the form of header spaces based on a source DM 122 and a destination DM 122, where each source-destination DM pair represents a pair of border devices 112. It should be understood that other such queries may be defined for verifying other network properties of interest. Each query be defined as a header space. Because the header space is multi-dimensional space where the value in each dimension is binary, the defined header space is represented as a BDD.

At 306, for each query, the VS 130 inputs (or provides) the BDD representing the corresponding input header space (also referred to as the input BDD) to the source DM 122 specified as the starting point of the query. In the present disclosure, providing the input BDD to the source DM 122 may be understood to mean supplying the input BDD to the source DM 122.

At 308, the VS 130 calculates the output header space by sequentially applying, to the input BDD, the DM 122 of each device along the path (in the logical topology of the logical domain 120) from the source DM 122 to the destination DM 122. It should be noted that there may be multiple paths from the source DM 122 to the destination DM 122 in the logical topology, and hence there may be multiple output header spaces.

Each DM 122 is a Boolean function, which is represented by a BDD (referred to as the DM BDD). The DM BDD models how the corresponding network device 112 processes a received packet, for example by forwarding the packet via a particular output port, or by blocking the packet (also referred to as dropping the packet). For a given DM 122 along the logical path, the VS 130 calculates the output header space (represented by an output BDD) by applying the given DM 122 to the header space that was inputted at the given DM 122 (it should be noted that the header space inputted at the given DM 122 may be the output header space from a previous DM 122 along the logical path). Because both the DM 122 and the input header space are represented by BDDs, applying the DM 122 to the header space is equivalent to conjugating the input BDD with the DM BDD. That is, a logical AND operation is performed between the input BDD and the DM BDD, mathematically represented as follows:

$$\text{output } BDD = (\text{input } BDD) \wedge (DM\ BDD)$$

where $\wedge$ represents the logical and operation.

In this way, each DM BDD along the logical path from the source model to the destination model is sequentially applied to the input BDD. Notably, the input BDD traverses only one DM BDD at a time. After the VS 130 has calculated the output BDD for a given DM BDD (e.g., using the above calculation), the memory resources of the VS 130 may be reused for the next DM BDD that is encountered in the logical path.

At 310, the final output header space outputted from the destination DM 122 (as defined by the query) is reported as a reachable header space for that query. The output header space may be reported in the form of an output BDD. It may be noted that, because the header space is computed using device-level BDDs (rather than a single network-level BDD, as in some conventional approaches), it is possible to identify a packet drop problem at a specific DM 122 (and hence a corresponding specific network device 112), if a reduced header space is reported. For example, using BDD operations, the output header space can be compared to the input header space at each DM 122 to identify if there has been any dropped header space.

Figure 4:
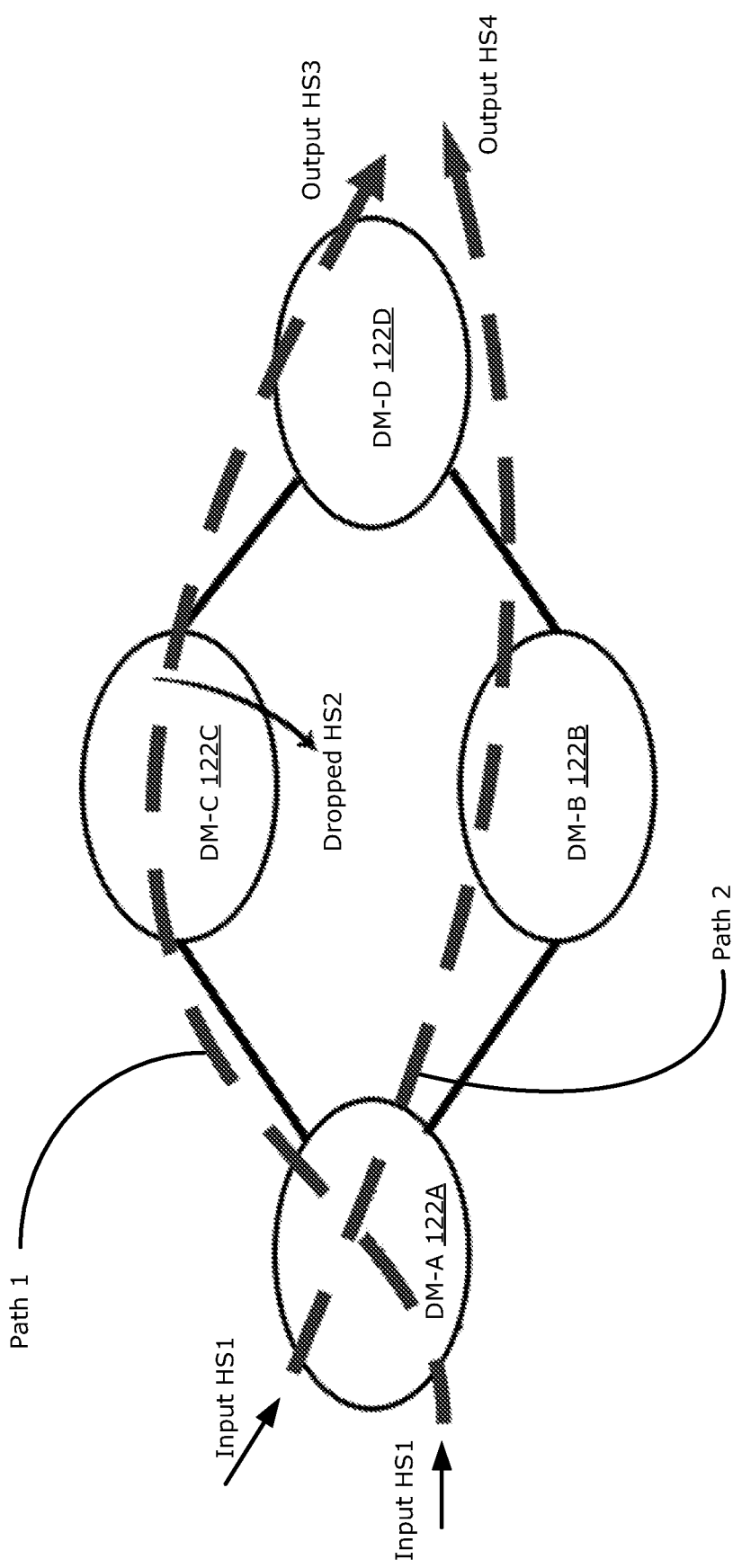
FIG. 4 illustrates an example implementation of the method of FIG. 3.

FIG. 4 shows an example implementation of the method 300, in the simplified logical topology of FIG. 1. The logical topology includes four DMs 122, namely DM-A 122A, DM-B 122B, DM-C 122C and DM-D 122D, each of which is represented by a respective BDD. For the purpose of discussion, the network property being verified in FIG. 4 may be reachability, and the query may define DM-A 122A to be the source DM and DM-D 122D to be the destination DM. Verification of other network properties of interest and using other queries may be performed in a manner similar to that described below.

An input header space (denoted as HS1) is inputted to DM-A 122A. As shown in FIG. 4, there are two logical paths (namely Path 1 and Path 2) between the source DM (namely DM-A 122A) and the destination DM (namely DM-D 122D) in the example logical topology shown in FIG. 4. The DMs along Path 1 are DM-A 122A, DM-C 122C and DM-D 122D, and an output header space (denoted as HS3) is calculated for Path 1 as follows:

$$HS3 BDD = (HS1 BDD) \wedge (DM\text{-}A\ BDD) \wedge (DM\text{-}C\ BDD) \wedge (DM\text{-}D\ BDD)$$

HS3 BDD thus represents the space of all headers that reaches DM-D 122D from DM-A 122A, when traveling along logical Path 1. In this example, there is also a dropped header space (denoted as HS2), representing all headers that are blocked (or dropped) by DM-C 122C.

The DMs along Path 2 are DM-A 122A, DM-B 122B and DM-D 122D, and another output header space (denoted as HS4) is calculated for Path 2 as follows:

$$HS4 BDD = (HS1 BDD) \wedge (DM\text{-}A\ BDD) \wedge (DM\text{-}B\ BDD) \wedge (DM\text{-}D\ BDD)$$

The HS3 BDD and HS4 BDD are reported as the union of all output header spaces for this query. The VS 130 may compare the reported output header space against the expected output to verify the network property of interest (e.g., to check reachability, the output header space is expected to be the same as the input header space; other network properties may be verified by performing other comparison procedures as appropriate). If the reported output header space is not expected, this may indicate there is a fault (e.g., unreachable device) in the network. The VS 130 may identify the dropped header space (i.e., HS2 in this example) and pass the dropped header space through individual DMs 122 in order to identify the source of the drop. In this example, when the dropped header space is passed through DM-C 122C, the resulting output from DM-C 122C is a reduced or empty header space, indicating that DM-C 122C is the source of the fault. By modeling network devices 112 as individual DMs 122, the VS 130 is able to identify the source of a fault with greater precision.

It should be understood that the verification process disclosed herein has some fundamental differences in how the header space is encoded, compared to the existing HSA approach. In HSA, the packet headers are encoded as subsets of geometric space. In contrast, in the disclosed verification process, packet headers are modeled as BDDs. HSA suffers from the state space explosion issue in the case of a large number of required bits of header space. In contrast, the disclosed verification process uses BDD, which is a more compressed structure for representing the header space and avoids the state space explosion problem. Moreover, HSA is typically limited to application in the data-plane. However, the disclosed verification approach may be utilized for both data-plane and control plane applications. This is because the VS 130 can generate different logical topologies in the logical domain 120 based on the type verifications. For example, for single physical network in the NVD 110, there may be several different logical topologies (e.g., one topology representing logical connections in the data-plane, and another topology representing logical connections in the control plane) which may be selectively used for the symbolic simulation.

An example of how a BDD model is generated for a given DM 122 is now described with reference to FIGS. 5 and 6.

Figure 5:
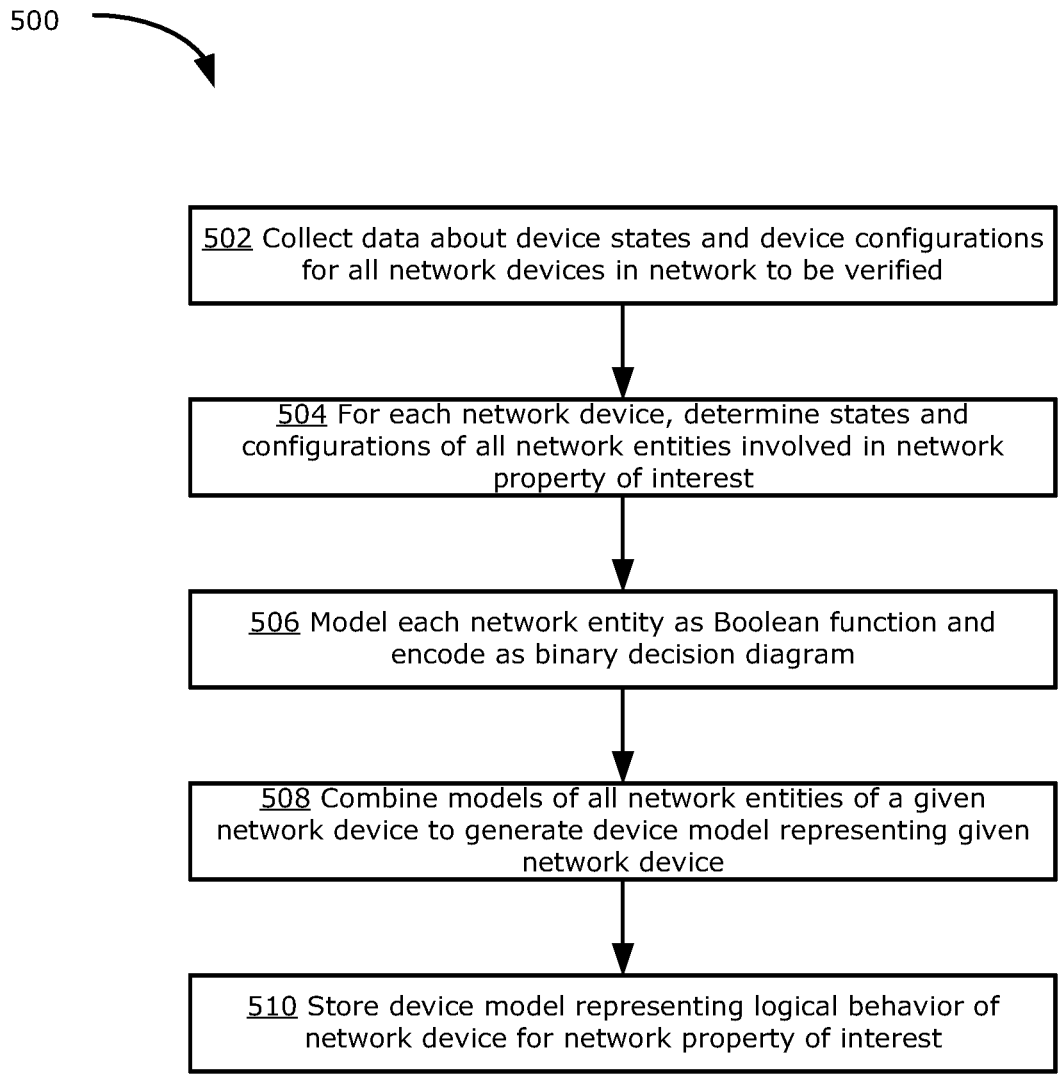
FIG. 5 is a flowchart illustrating an example method for generating a BDD model, in accordance with examples described herein.

FIG. 5 is a flowchart illustrating an example method 500 that may be performed by the VS 130 (e.g., implemented by the computing system 220, by the processor device 225 executing instructions 238) to generate a BDD model for each DM 122.

At 502, data about device states and device configurations are collected for all network devices 112 in the NVD 110 representing the physical network to be verified. The data may be collected for a particular network property of interest (e.g., the network property to be verified).

At 504, for each given network device 112, all NEs (e.g., ingress/egress ACL, FIB, Routing policy, protocol configurations, etc.) involved in the property of interest are determined, and corresponding NE states as well as configurations are determined by the VS 130. For example, the VS 130 may extract information about NE states and configurations from the data collected at step 502.

At 506, the VS 130 models each NE in each network device 112 as a respective Boolean function. For example, the Boolean function for modeling a given NE may be derived from the configuration of the given NE. The Boolean function is encoded into a BDD format. For example, if the network property of interest is reachability, each NE may be modeled as a Boolean transfer function between two ports, and the function encoded into BDD format.

At 508, the models of all NEs belonging to a given network device 112 are combined, based on the logical interactions of the NEs, to generate a single DM 122 representing the function of the given network device 122, for the network property of interest. For example, if the property of interest is reachability, the models of all NEs in the logical path from an ingress port of the network device 112 to an egress port can be combined using a logical AND operation, to generate a single port-to-port model representing the reachability between two ports of the network device 122. Then a DM 122 for the network device 122 can be generated by joining all port-to-port models by a logical OR operation. In this way, a single DM 122 may be computed for each network device 112, to enable verification of a reachability property. Other models may be similarly generated to represent the behavior of each network device 112 with respect to other network properties of interest.

At 510, the models of all the DMs 122 representing all network devices 112 are stored by the VS 130. The stored models thus represent the logical behavior of all network devices 112 in the NVD 110, and the logical behavior of all NEs within each network device 112, for the network property of interest. The stored DMs 122 may then be used to verify the behavior of the network, according to the property of interest, as discussed above.

Figure 6:
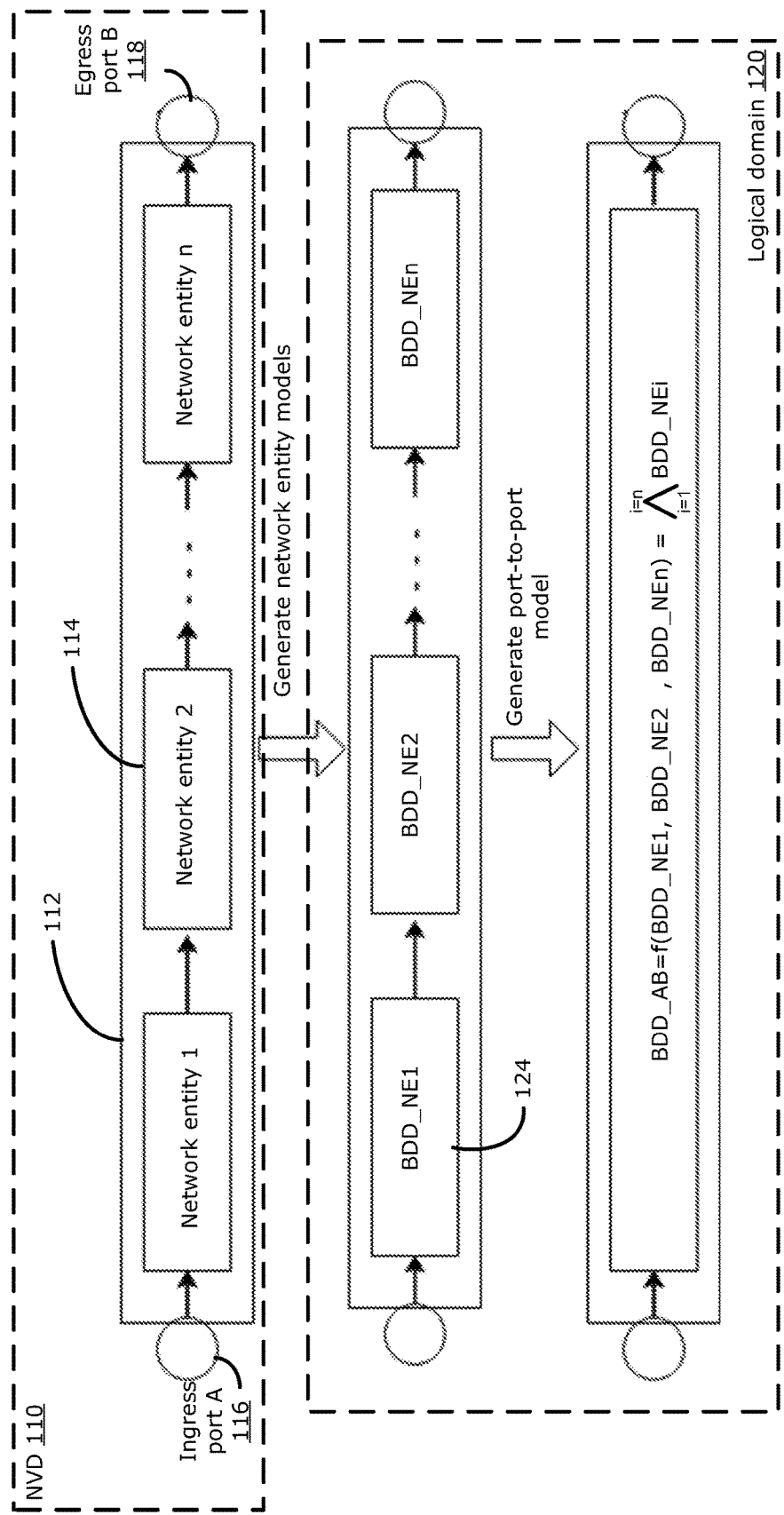
FIG. 6 illustrates an example implementation of the method of FIG. 5.

FIG. 6 shows an example implementation of some steps of the method 500, in a simplified network device 112. FIG. 6 illustrates an example of how a port-to-port model is generated in the logical domain 120, for a given network device 112 in the NVD 110, for verification of a reachability property of the network.

In this example, the network device 112 includes a number, n, of NEs 114 (indicated as network entity 1, network entity 2, to network entity n) in the logical path from ingress port A 116 to egress port B 118. Each NE 114 may independently be any NE as discussed herein. In particular, with respect to the reachability property, each NE 114 may independently be a set of rules or a table (e.g., a routing table) used in the network device 112 to manage routing of a packet based on information contained in the packet header. The configuration and state of each NE 114 are collected and determined at steps 502-504 described above. From this information, at step 506 each NE 114 is modeled as a Boolean function and encoded as respective BDDs 124 in the logical domain 120. For example, for data plane verification, each NE 114 may be modeled as a Boolean function that applies a forwarding rule based on the binary bits representing an address (e.g., IP or MAC address) of the packet source and/or destination, in the packet header. Each NE 114 may transition the packet from one state to another, or change the position of the packet in the logical path.

In the example shown, respective NE-level BDDs 124 (indicated as BDD_NE1, BDD_NE2, to BDD_NEn) are generated for each respective NE 114, and stored by the VS 130. Each NE 114-level BDD 124 is a function that may be encountered by a packet along the logical path from an ingress port to an egress port. The port-to-port model between ports A and B, which is in the form of a port-to-port BDD representing the Boolean function governing routing of a packet from ingress port A 116 to egress port B 118, is then generated by combining all NE-level BDDs 124 using logical AND operations. Mathematically, the port-to-port BDD from port A to port B (denoted as BDD_AB) may be generated as follows:

$$BDD\_AB = f(BDD\_NE1, BDD\_NE2, \ldots, BDD\_NEn)$$
$$= \bigwedge_{i=1}^{i=n} BDD\_NEi$$

where BDD_NE1 to BDD_NEn are the BDDs 124 representing the n NEs 114 in the logical path between ingress port A 116 and egress port B 118, and the symbol ∧ denotes the logical AND operation.

The port-to-port model may be similarly generated for all logical paths from all possible ingress ports to all possible egress ports of the network device 112. Then the DM 122 for the network device 112 is generated by combining all port-to-port models using a logical OR operation. The DM 122 generated for the given network device 112 may then be stored by the VS 130, and used for verifying the reachability property of the network (e.g., using method 300 as described above).

The modeling approach described above may be used to verify any aspect or mechanism in of the physical network. Notably, in the approach described above, each network device is modeled as a respective BDD, and the network is verified by traversing the device-level BDDs one by one, instead of using a single network-level BDD for verification. This approach may help to mitigate that state explosion problem.

Further, after traversing a device-level BDD in the logical topology, the memory resources used for storing the device-level BDD can be reused for the next device-level BDD along the logical path. Accordingly, the maximum size of BDD that needs to be processed at any time (and hence the amount of computing and memory resources required for that processing step) corresponds to the most complex network device (e.g., having the most NEs) in the network. The complexity of the BDD is capped at the device level, and does not increase with increased network size. This enables greater scalability because increasing the network size will not result in a BDD that exceeds computing or memory resources to process.

Because the verification is performed by traversing the network on a device level, rather than as a single network level BDD, more specific information about the source of a network fault may be determined. For example, if there is a packet drop problem in the network (e.g., as indicated by a reduced header space being reported as the output header space when verification is performed), the specific network device at which the packet drop problem is occurring can be identified.

As described above, a logical model (represented by a NE-level BDD) is generated for each NE in a given network device, in order to build up the logical model (represented by a device-level BDD) for the given network device. To enable tracing of a problem to a specific NE, information associating the device-level BDD (corresponding to a given network device) with the NE-level BDDs (corresponding to the NEs of the given network device) should also be stored. Thus, a device-level logical model for a given network device may be associated with a hierarchy of lower-level models corresponding to the NEs of that given network device. This hierarchy-based approach for model generation may enable more specific location of a source of a detected network fault. More generally, a hierarchy-based device model may be generated down to any desired level of granularity, in order to represent the logical behavior of the device down to any desired level of detail. For example, each logical rule applied by a given NE may also be modeled by a respective rule-level BDD and associated with the NE-level BDD representing the given NE.

Thus, each hierarchy level corresponds to a different scope of actions, with lower-level models representing a smaller scope of behavior than higher-level models. For generality, the present disclosure may refer to a network device, NE or rule as a model entity that applies a logical Boolean function (representable as a BDD) to an input packet. In the present disclosure, the term model entity is used to refer to a logical representation (modeled by Boolean functions) of how a given entity at any hierarchy level (e.g., network device, NE, rule, etc.) processes a header space. Each model entity corresponds to a respective hierarchy level and is representable by a respective model at that hierarchy level. Generally, a single higher-level model may represent the overall behavior of one or more lower-level models associated with the higher-level model. For example, a device-level model represents the overall logical behavior of a device including all NEs within the device, whereas a NE-level model represents the logical behavior of a single NE within the device. At an even lower hierarchy level, individual logical rules implemented by the single NE may be represented by respective rule-level models.

Using the hierarchy-based modeling approach disclosed herein, different logical models with different verification context information and with different granularity and scope of actions are generated and related to each other in a hierarchical manner. Verification may then be performed at different hierarchical levels to more precisely identify the source of a detected fault.

Figure 7:
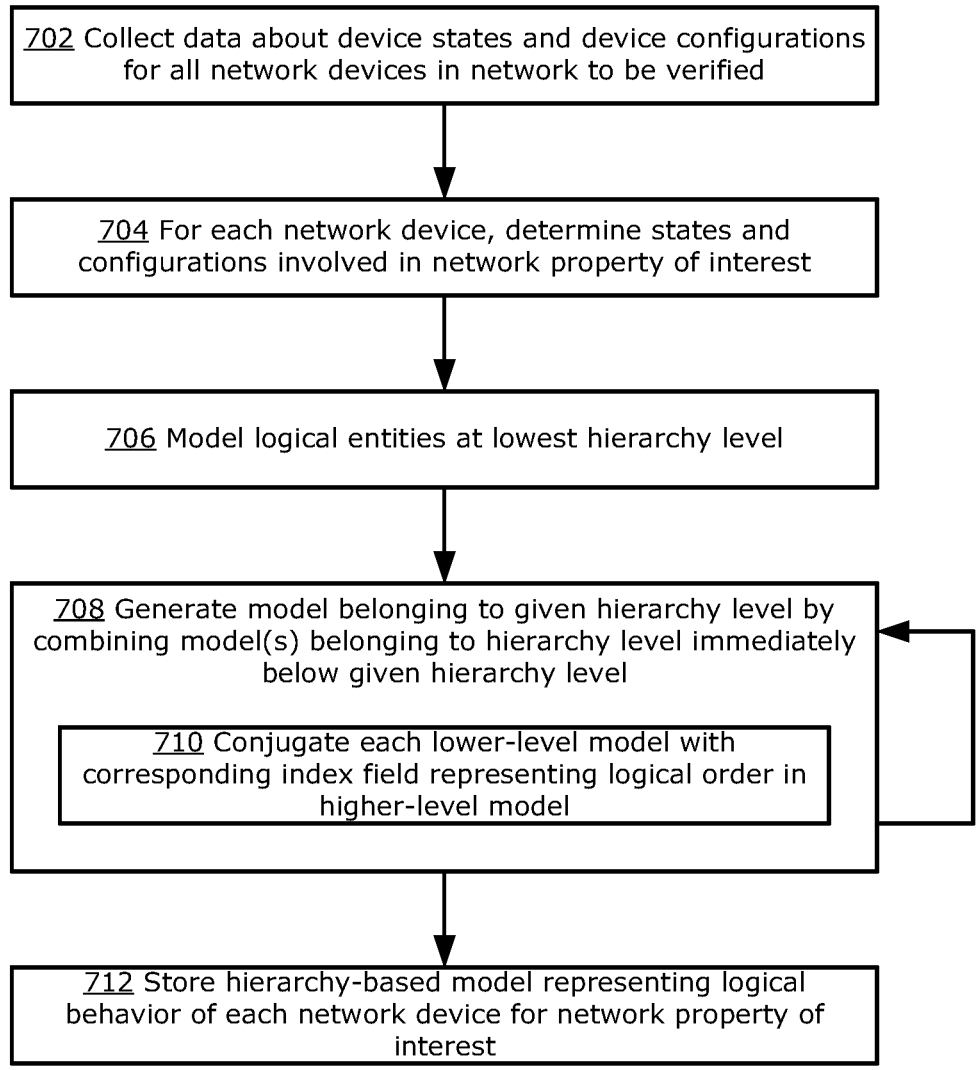
FIG. 7 is a flowchart illustrating an example method for generating a hierarchy-based model, in accordance with examples described herein.

FIG. 7 is a flowchart illustrating an example method 700 that may be performed by the VS 130 (e.g., implemented by the computing system 220, by the processor device 225 executing instructions 238) to generate a hierarchy-based BDD model for each DM 122.

At 702, data about device states and device configurations are collected for all network devices 112 in the NVD 110 representing the physical network to be verified. The data may be collected for a particular network property of interest (e.g., the network property to be verified). The data is collected for all model entities within all network devices 112, down to a desired hierarchy level (e.g., down to NE-level or rule-level). For example, a hierarchy-based model may be predefined at the VS 130 to have certain desired levels, prior to or at the start of the method 700.

At 704, for each given network device 112, all model entities are determined for each desired level of the hierarchy-based model, and their corresponding states and configurations are also determined. For example, if the hierarchy-based model is to be generated down to the rule-level, then all NEs (e.g., ingress/egress ACL, FIB, Routing policy, protocol configurations, etc.) and logical rules involved in the property of interest are determined, and corresponding states and configurations are determined by the VS 130. The VS 130 may extract this information from the data collected at step 702.

At 706, the VS 130 models each model entity at the lowest hierarchy level as a respective Boolean function. For example, the lowest level of the hierarchy-based model may be defined to be the rules implemented by each NE. The Boolean function for modeling a given rule may be derived from the configuration data. The Boolean function is encoded into a BDD format, and stored as a rule-level BDD.

At 708, the models of all model entities at higher levels of the hierarchy-based model are generated by combining lower-level models. Specifically, the model representing a given model entity at a given hierarchy level is generated by combining one or more models representing respective one or more other model entities residing within the given model entity, where the combined model(s) belong to a hierarchy level immediately below the given hierarchy level (i.e., one level down in the hierarchy).

As discussed above, a packet traversing a logical path from an ingress port to an egress port of a network device encounters one or more NEs residing in the network device. It should be noted that the packet encounters the NE(s) in a certain logical order. If an input header space is processed at the device-level BDD, it is not important to know the order in which each NE operates on the header space. However, if the header space is processed at the more detailed NE-level BDDs, it is useful to identify each NE-level BDD within the network device, to enable identification of a fault at the NE-level. More generally, it is useful to be able to identify each lower-level model residing under a higher-level model, in order to enable the precise lower-level source of a fault.

Accordingly, step 708 includes step 710 to include information about the index of a lower-level model. To include information about the index of a lower-level model, a new vector of BDD variables is introduced into the BDD space to represent the indices of lower-level models, where the value of each index variable indicates the logical order of a respective lower-level model within the higher-level model.

At 710, each lower-level model (residing within a given higher-level model) is conjugated (using a logical AND) with a corresponding index variable that represents (in BDD format) the logical order of the lower-level model within the given higher-level model. The order of the lower-level model within the given higher-level model is thus encoded within the lower-level BDD.

Mathematically, a model of a given higher-level model entity at level i+1 of the hierarchy-based model may be denoted as $M_{i+1}$. The lower-level model entities, at level i, residing in the higher-level model entity $M_{i+1}$ may be represented by respective Boolean functions, denoted as $C_l$, where l is the index representing the logical order of the lower-level model entity within $M_{i+1}$. If the number of level i model entities is denoted as n, the higher-level model $M_{i+1}$ may be generated by combining level i models using the formula:

$$M_{i+1} = \bigvee_{l=1}^{n} \bigwedge_{j=1}^{l-1} (C_l \wedge \overline{C}_j)$$

where the symbol V denotes the logical OR operation. In this formula, the index j is used to index all lower-level models within a given model at level l. Using the above formula, each lower-level $C_j$ is evaluated first, and the higher-level $C_l$ is evaluated only after all lower-level $C_j$ within the higher-level $C_l$ has been evaluated to false. The model $M_{i+1}$ thus includes information from the hierarchical relationship between model entities within the model $M_{i+1}$, as well as the index indicating the logical order of the lower-level model entities within the model $M_{i+1}$.

Step 708 (including step 710) is repeated for each desired level of the hierarchy-based model, moving from lower to successively higher levels, until the highest level (e.g., device-level) of the hierarchy-based model is reached.

At 710, the models of all the DMs 122 representing all network devices 112 are stored by the VS 130. The stored models include hierarchical information and include information about the order of lower-level model entities residing in a higher-level model entity, and also include information about the hierarchical relationships of the models. For example, the VS 130 may store information that indicates which lower-level models are used to build up which higher-level model. The stored DMs 122 may be used to verify the behavior of the network, according to the property of interest. In particular, different hierarchy levels may be traversed during verification, as discussed further below.

It may be understood that the method 700 encompasses the method 500 described above. For example, the method 500 may be considered an implementation of the method 700 where the hierarchy-based model is generated down to the NE-level.

Figure 8:
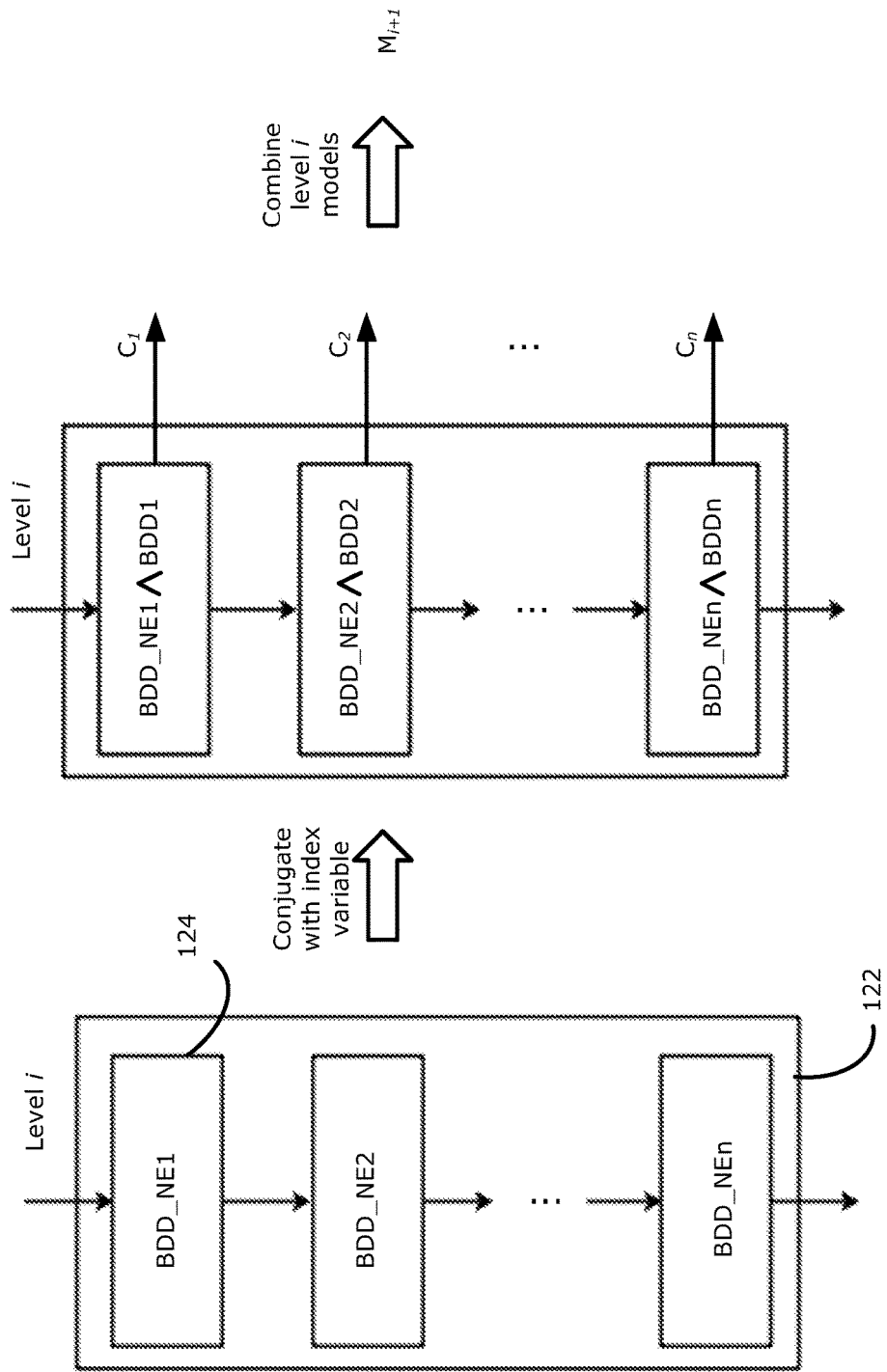
FIG. 8 illustrates an example implementation of the method of FIG. 7.

FIG. 8 shows an example implementation of step 708 of the method 700. In this example, the higher-level model (at level i+1) is the device-level model (i.e., DM 122) and the lower-level model (at level i) is the NE-level model. It should be understood that this example may be generalized any level of the hierarchy-based model.

As shown in FIG. 8, there are n lower-level models (i.e., NE-level BDDs 124, denoted as BDD_NE1 to BDD_NEn) at level i within the higher-level model (i.e., DM 122). The NE-level BDDs 124 are traversed by a packet in a defined logical order corresponding to the index 1 to n. The NE-level BDDs 124 are conjugated with the index variable (e.g., binary representations of the index variable, denoted as BDD1 to BDDn) to encode the logical order of each NE-level BDD 124, to obtain NE-level BDDs $C_1$ to $C_n$. The NE-level BDDs are then combined to obtain the higher-level model $M_{i+1}$, which in this example is the DM 122.

Using the hierarchy-based model, network verification may be performed at different levels of detail. Verification that is performed using the highest hierarchy level (e.g., at the device-level) may provide an overall check of the network, with overall pass or fail reported. A first verification scan of the network may be performed at the device-level to quickly check the overall performance of the network. The device-level verification may be performed as described with respect to FIG. 3 above. Because most of the time there should be no fault in the network, a device-level verification provides a relatively fast way to verify the network. In the event that a fault is encountered in the device-level verification, additional verification can be performed at a lower hierarchy level to identify the source of the fault.

Figure 9:
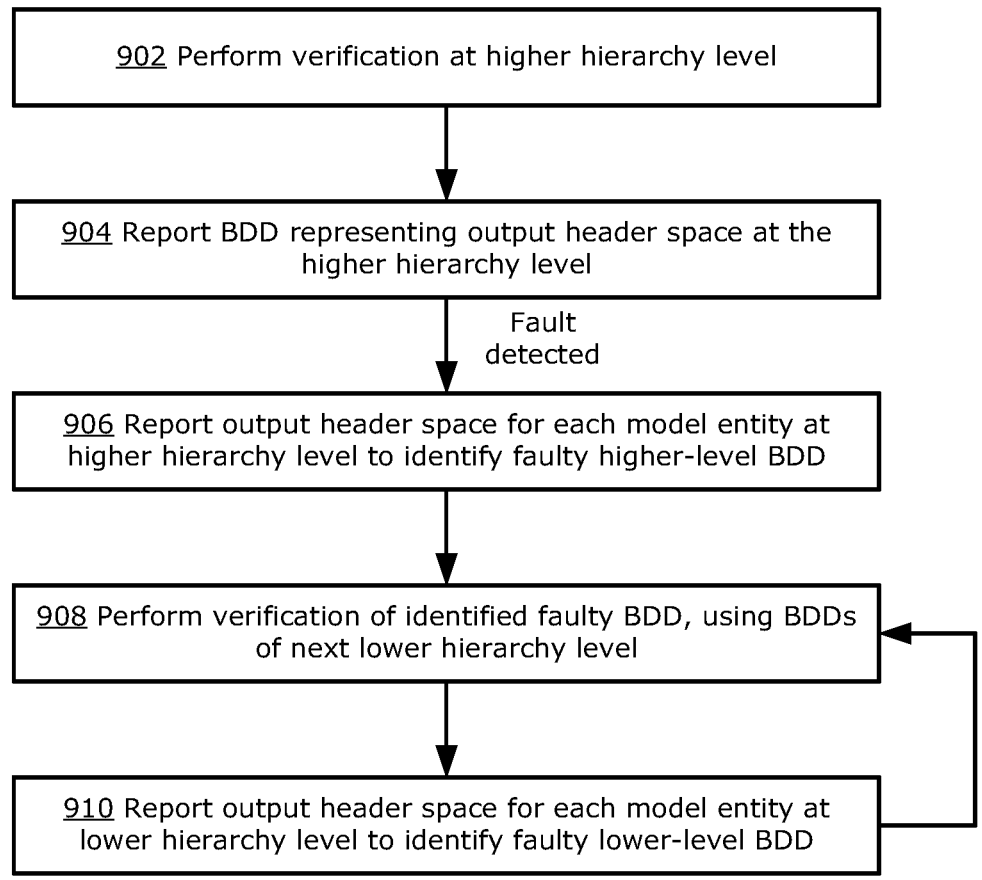
FIG. 9 is a flowchart illustrating an example method for network verification using hierarchy-based models, in accordance with examples described herein.

FIG. 9 is a flowchart illustrating an example method 900 for network verification using hierarchy-based models, which is performed by the VS 130 (e.g., implemented by the computing system 220, by the processor device 225 executing instructions 238).

At 902, verification is performed at a higher hierarchy level. For example, verification may be first performed at the highest hierarchy level, which may be at the device-level. Verification may be performed similarly to the method 300 described above. For example, verification may be performed by inputting an input BDD (or providing an input BDD), representing an input header space, to the source model (representing a source device 112 in the NVD 110) at the higher hierarchy level. In the present disclosure, providing the input BDD to the source model may be understood to mean supplying the input BDD to the source model. The output header space is then calculated along the logical path from the source model to the destination model (representing a destination device 112 in the NVD 110) at the higher hierarchy level.

At 904, the BDD representing the output header space at the higher hierarchy level is reported. Using the output header space, the VS 130 determines whether there is a fault at the higher hierarchy level. If no fault is detected, the method 900 may end. If a fault is detected (e.g., the output header space is reduced or is not expected), the method 900 proceeds to step 906.

At 906, the header space BDD is passed through the higher-level BDD representing each model entity at the higher hierarchy level and the output header space is reported for each higher-level BDD. A faulty higher-level BDD is identified (e.g., by identifying the higher-level BDD that outputs a reduced or empty header space).

At 908, verification of the identified faulty BDD is performed. This second verification is performed using the lower-level BDDs that make up the faulty higher-level BDD. In some examples, this lower-level verification may be performed similar to the higher-level verification. For example, a dropped BDD representing a dropped header space is inputted to the source model at the lower hierarchy level. The output BDD representing the output header space is then calculated along the logical path from the source model to the destination model at the lower hierarchy level. In some examples, the lower-level verification may be performed only for the identified faulty BDD and all other BDDs along the logical path may be kept at the higher-level representation. That is, the logical path may be traversed using higher-level BDDs, except for the identified faulty BDD which is replaced with the lower-level BDDs that make up the faulty BDD at the next lower hierarchy level. The output from each lower-level BDD may be reported, similar to the process described above. In some examples, the lower-level verification may be performed only for a portion of the logical path specific to the identified faulty BDD, instead of the full logical path from the source model to the destination model. For example, the header space may be directly inputted to the set of lower-level BDDs making up the identified faulty BDD, and the output from each lower-level BDD reported accordingly.

At 910, the output BDD representing the output header space is reported for each lower-level BDD. If the output BDD from a given model is empty, this indicates that the given model is the source of the fault. Because each lower-level BDD is encoded with the respective index (representing the logical order of the lower-level BDD within the higher-level BDD), the report is used by the VS 130 to obtain the index of the lower-level BDD that is the source of the fault. Hence, the VS 130 is able to identify the faulty lower-level BDD within the faulty higher-level BDD.

Steps 908-910 may be repeated for a third (or more) verification at successively lower hierarchy levels, until a desired level of granularity is reached (or until the lowest level of the hierarchy-based model is reached). For example, the first verification may be performed at the device-level to identify a faulty DM 122, the second verification may be performed at the NE-level to identify a faulty NE-level BDD 124 within the faulty DM 122, and the third verification may be performed to identify a faulty rule-level BDD within the faulty NE-level BDD 124.

The VS 130 may thus identify the source of a detected fault down to any desired level of granularity.

Figure 10:
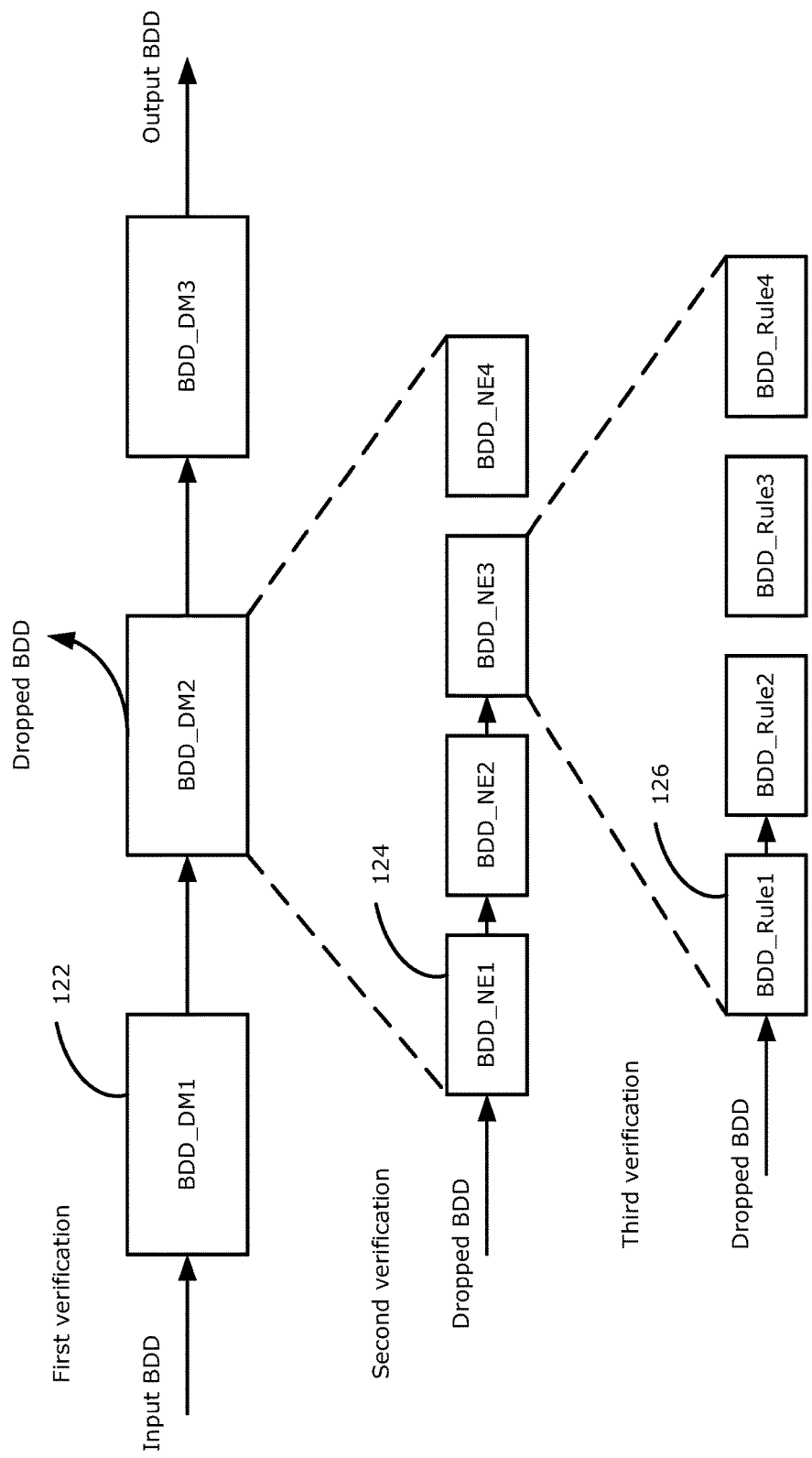
FIG. 10 illustrates an example implementation of the method of FIG. 9.

FIG. 10 shows an example implementation of the method 900. In the simplified logical topology shown, there are three DMs 122 in a single logical path, each of which is represented by a respective BDD (denoted as BDD_DM1, BDD_DM2, BDD_DM3). In this hierarchy-based model, the device-level is the highest hierarchy level, followed by the NE-level as the next lower hierarchy level, and the rule-level is the lowest hierarchy level. For the purpose of discussion, the network property being verified in FIG. 10 may be reachability, and the input header space is generated for a query starting at BDD_DM1 as the source model and BDD_DM3 as the destination model. Verification of other network properties of interest and using other queries may be performed in a manner similar to that described below.

Verification is performed starting with a first verification that is performed at the highest hierarchy level (i.e., the device-level in this example). In the first verification, the input header space is inputted to BDD_DM1 and the output header space is reported after passing through BDD_DM2 and finally BDD_DM3. In this example, a dropped header space is reported for BDD_DM2, indicating that BDD_DM2 is the source of a detected fault in the network.

In order to more precisely identify the source of the detected fault, the identified faulty higher-level BDD (in this case, BDD_DM2) is replaced with the more detailed lower-level BDD (i.e., the NE-level BDDs 124). In the second verification, the VS 130 inputs the dropped header space and obtains the index of the NE-level BDD that is the source of the fault (in this example, BDD_NE3).

This approach is repeated for a third verification in which the faulty NE-level BDD is replaced with the next lower level BDDs (i.e., the rule-level BDDs 126). The dropped header space is inputted by the VS 130 and the index of the rule-level BDD that is source of the fault is obtained (in this example, BDD_Rule2).

This example illustrates how the VS 130 can more precisely locate the source of a detected fault, using multiple verification scans on models at different hierarchy levels. Using a hierarchy-based approach to verification enables more detailed information to be obtained (using lower-level models) to more precisely locate the source of a fault, and also enables faster execution (using higher-level models) for overall verification of a network when there is no fault. Also, as mentioned previously, using device-level models for network-level verification helps avoid the problem of state explosion. Accordingly, the hierarchy-based approach may enable more efficient network verification as well as more accurate trouble shooting.

It may be noted that, in some examples, instead of preparing logical models for representing whole devices and network entities (e.g., using collected state and configuration data), more detailed models can be derived using collected statistics of prior failures and/or the scope of known changes in the network using various techniques known in the art (see, for example, Steffen et al. "Probabilistic verification of network configurations", SIGCOMM '20). This may enable logical models to be generated to focus on only certain aspects of interest (e.g., to focus on only functions that are known to be prone to failure and/or that are known to have changed), instead of generating fully detailed models for all devices and entities. Such an approach may reduce the resources (e.g., required memory and/or required computing time) needed for model generation.

Although the present disclosure has described examples in which the highest hierarchy level in a hierarchy-based model is at the single device level (i.e., a single DM representing a single network device), the present disclosure may also be adapted for abstracting portions of a network containing multiple network devices. That is, the hierarchy-based model may include hierarchy levels higher than the single device level. For example, there may be a hierarchy level in which a device-group is represented as a single logical model.

The present disclosure has described an approach to network verification in which a network may be verified by dynamically traversing logical models (e.g., represented by BDDs) representing network devices one-by-one, instead of traversing one aggregated model representing the entire network. Such an approach may help to mitigate the state explosion problem of model checking. After each device-level BDD has been traversed, the verification service may reset the BDD reuse the memory resources for processing the next device-level BDD. Further, the largest BDD that need to be processed is capped at the device level, rather than increasing with increased network size. Thus, the disclosed approach enables better scalability compared to conventional verification approaches.

In various examples, the present disclosure describes a hierarchy-based approach to network verification, in which the source of a detected network fault may be identified with greater precision compared to conventional verification approaches (which typically use a single network-level verification scan).

The present disclosure may be applicable to verification of any types of networks, including both wired and wireless networks, as well as any individual mechanisms in the networking domain.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for verification of a network, comprising:
providing an input binary decision diagram (BDD) as input to a device-level BDD representing a source device in a logical topology representing connections among devices of the network, the input BDD representing an input header space to query for a network property of interest, each individual device in the network being represented by a respective individual device-level BDD in the logical topology, each individual device-level BDD representing a single individual device and encoding a device-specific logical behavior of the respective individual device as a Boolean function;

calculating an output BDD representing an output header space obtained by a destination device in the logical topology, the output BDD being calculated by sequentially applying, to the input BDD, each individual device-level BDD in a logical path from the source device to the destination device;

reporting the output BDD;

comparing the reported output BDD to an expected output BDD to verify the network property of interest;

detecting, from comparison of the reported output BDD with the expected output BDD, a fault in the network;

determining a dropped BDD by computing a difference between the expected output BDD and the reported output BDD, the dropped BDD representing a dropped header space;

providing the dropped BDD as input to each individual device-level BDD and determining whether output from each individual device-level BDD is a reduced or empty header space compared to the dropped header space represented by the dropped BDD; and identifying, as a source of the fault in the network, a faulty device represented by a particular individual device-level BDD that is determined to have outputted a reduced or empty header space.

2. The method of claim 1, wherein each individual device is represented by a respective individual hierarchy-based model including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more lower level model entities of the respective device.

3. The method of claim 2, wherein the one or more lower level model entities include one or more network entities (NEs) residing on the respective device, each NE being represented by a respective NE-level BDD at the first lower hierarchy level.

4. The method of claim 3, wherein the hierarchy-based model further includes a second lower hierarchy level that is lower than the first lower hierarchy level corresponding to the one or more NEs in the hierarchy-based model, the second lower hierarchy level corresponding to one or more rule-level BDDs representing respective one or more logical rules implemented by the one or more NEs.

5. The method of claim 2, wherein each lower level BDD is conjugated with a respective index variable indicating a logical order of the respective model entity in a logical path from an ingress to an egress of the respective device.

6. The method of claim 1, wherein the faulty device is represented by a hierarchy-based model including a hierarchy level corresponding to the particular individual device-level BDD and including at least a first lower hierarchy level that is lower than the hierarchy level corresponding to the particular individual device-level BDD, the first lower hierarchy level corresponding to one or more lower level BDDs representing functional behavior of respective one or more lower level model entities of the faulty device;

the method further comprising:
performing a lower level verification using the hierarchy-based model representing the faulty device by:
providing the dropped BDD as input to the one or more lower level BDDs in the hierarchy-based model;
calculating an output BDD from each lower level BDD; and
identifying, from the calculated output BDD, a faulty lower level model entity of the identified faulty device.

7. The method of claim 1, further comprising:
generating the device-level BDD for a given device by:
collecting data about device states and device configurations, the collected data including data about one or more model entities implemented by the given device;
modeling each model entity as a respective Boolean function and encoding the respective Boolean function as a respective BDD;
logically combining the respective BDDs representing the one or more model entities within the given device; and
storing the logical combination as the device-level BDD representing the given device.

8. The method of claim 1, wherein each individual device is represented by a respective individual hierarchy-based including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more model entities implemented by the respective device, the method further comprising:
generating the hierarchy-based model for a given device by:
collecting data about device states and device configurations, the collected data including data about the one or more lower level model entities implemented by the given device;
modeling each model entity corresponding to a lowest level of the hierarchy-based model as a respective Boolean function and encoding the respective Boolean function as a respective BDD;
generating BDDs for each successively higher level of the hierarchy- based model by, for a given hierarchy level:
generating a BDD representing a given model entity at the given hierarchy level by logically combining BDDs representing one or more lower level model entities implemented by the given model entity, the one or more lower level model entities belonging to a lower hierarchy level immediately below the given hierarchy level;
wherein each BDD representing a respective lower level model entity is conjugated with a respective index variable indicating a logical order of the respective lower level model entity implemented by the given model entity; and
storing the BDDs for each hierarchy level.

9. A computing system for verification of a network, the computing system comprising:
a processor device; and
a memory storing instructions which, when executed by the processor device, cause the computing system to:

define an input binary decision diagram (BDD), the input BDD representing an input header space to query for a network property of interest;

provide the input BDD as input to a device-level BDD representing a source device in a logical topology representing connections among devices of the network, each individual device in the network being represented by a respective individual device-level BDD in the logical topology, each individual device-level BDD representing a single individual device and encoding a device-specific logical behavior of the respective individual device as a Boolean function;

calculate an output BDD representing an output header space obtained by a destination device in the logical topology, the output BDD being calculated by sequentially applying, to the input BDD, each individual device-level BDD in a logical path from the source device to the destination device;

report the output BDD;

compare the reported output BDD to an expected output BDD to verify the network property of interest;

detect, from comparison of the reported output BDD with the expected output BDD, a fault in the network;

determine a dropped BDD by computing a difference between the expected output BDD and the reported output BDD, the dropped BDD representing a dropped header space;

provide the dropped BDD as input to each individual device-level BDD and determining whether output from each individual device-level BDD is a reduced or empty header space compared to the dropped header space represented by the dropped BDD; and identify, as a source of the fault in the network, a faulty device represented by a particular individual device-level BDD that is determined to have outputted a reduced or empty header space.

10. The computing system of claim 9, wherein each individual device is represented by a respective individual hierarchy-based model including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more lower level model entities of the respective device.

11. The computing system of claim 10, wherein the one or more lower level model entities include one or more network entities (NEs) residing on the respective device, each NE being represented by a respective NE-level BDD at the first lower hierarchy level.

12. The computing system of claim 11, wherein the hierarchy-based model further includes a second lower hierarchy level that is lower than the first lower hierarchy level corresponding to the one or more NEs in the hierarchy-based model, the second lower hierarchy level corresponding to one or more rule-level BDDs representing respective one or more logical rules implemented by the one or more NEs.

13. The computing system of claim 10, wherein each lower level BDD is conjugated with a respective index variable indicating a logical order of the respective model entity in a logical path from an ingress to an egress of the respective device.

14. The computing system of claim 9, wherein the faulty device is represented by a hierarchy-based model including a hierarchy level corresponding to the particular individual device-level BDD and including at least a first lower hierarchy level that is lower than the hierarchy level corresponding to the particular individual device-level BDD, the first lower hierarchy level corresponding to one or more lower level BDDs representing functional behavior of respective one or more lower level model entities of the faulty device; the instructions further causing the computing system to:

perform a lower level verification using the hierarchy-based model representing the faulty device by:
providing the dropped BDD as input to the one or more lower level BDDs in the hierarchy-based model;
calculating an output BDD from each lower level BDD; and
identifying, from the calculated output BDD, a faulty lower level model entity of the identified faulty device.

15. The computing system of claim 9, wherein the instructions further cause the computing system to:

generate the device-level BDD for a given device by:
collecting data about device states and device configurations, the collected data including data about one or more model entities implemented by the given device;
modeling each model entity as a respective Boolean function and encoding the respective Boolean function as a respective BDD;
logically combining the respective BDDs representing the one or more model entities within the given device; and
storing the logical combination as the device-level BDD representing the given device.

16. The computing system of claim 9, wherein each individual device is represented by a respective individual hierarchy-based model including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more model entities implemented by the respective device, the instructions further causing the computing system to:

generate the hierarchy-based model for a given device by:
collecting data about device states and device configurations, the collected data including data about the one or more lower level model entities implemented by the given device;
modeling each model entity corresponding to a lowest level of the hierarchy-based model as a respective Boolean function and encoding the respective Boolean function as a respective BDD;
generating BDDs for each successively higher level of the hierarchy-based model by, for a given hierarchy level:
generating a BDD representing a given model entity at the given hierarchy level by logically combining BDDs representing one or more lower level model entities implemented by the given model entity, the one or more lower level model entities belonging to a lower hierarchy level immediately below the given hierarchy level;
wherein each BDD representing a respective lower level model entity is conjugated with a respective index variable indicating a logical order of the respective lower level model entity implemented by the given model entity; and storing the BDDs for each hierarchy level.

17. A non-transitory computer-readable medium having instructions stored thereon, wherein the instructions, when executed by a processor device of a computing system, cause the computing system to:

define an input binary decision diagram (BDD), the input BDD representing an input header space to query for a network property of interest;

provide the input BDD as input to a device-level BDD representing a source device in a logical topology representing connections among devices of a network, each individual device in the network being represented by a respective individual device-level BDD in the logical topology, each individual device-level BDD representing a single individual device and encoding a device-specific logical behavior of the respective individual device as a Boolean function;

calculate an output BDD representing an output header space obtained by a destination device in the logical topology, the output BDD being calculated by sequentially applying, to the input BDD, each individual device-level BDD in a logical path from the source device to the destination device;

report the output BDD;

compare the reported output BDD to an expected output BDD to verify the network property of interest;

detect, from comparison of the reported output BDD with the expected output BDD, a fault in the network;

determine a dropped BDD by computing a difference between the expected output BDD and the reported output BDD, the dropped BDD representing a dropped header space;

provide the dropped BDD as input to each individual device-level BDD and determining whether output from each individual device-level BDD is a reduced or empty header space compared to the dropped header space represented by the dropped BDD; and identify, as a source of the fault in the network, a faulty device represented by a particular individual device-level BDD that is determined to have outputted a reduced or empty header space.

18. The non-transitory computer-readable medium of claim 17, wherein each individual device is represented by a respective individual hierarchy-based model including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more lower level model entities of the respective device.

19. The non-transitory computer-readable medium of claim 17, wherein the faulty device is represented by a hierarchy-based model including a hierarchy level corresponding to the particular individual device-level BDD and including at least a first lower hierarchy level that is lower than the hierarchy level corresponding to the particular individual device-level BDD, the first lower hierarchy level corresponding to one or more lower level BDDs representing functional behavior of respective one or more lower level model entities of the faulty device;

the instructions further causing the computing system to:

perform a lower level verification using the hierarchy-based model representing the faulty device by:

providing the dropped BDD as input to the one or more lower level BDDs in the hierarchy-based model;

calculating an output BDD from each lower level BDD; and identifying, from the calculated output BDD, a faulty lower level model entity of the identified faulty device.

20. The non-transitory computer-readable medium of claim 17, wherein each individual device is represented by a respective individual hierarchy-based model including a hierarchy level corresponding to the respective individual device-level BDD and including at least a first lower hierarchy level that is lower than the hierarchy level corresponding to the respective individual device-level BDD, the first lower hierarchy level corresponding to one or more lower level BDDs representing functional behavior of respective one or more model entities implemented by the respective device, the instructions further causing the computing system to:

generate the hierarchy-based model for a given device by:

collecting data about device states and device configurations, the collected data including data about the one or more lower level model entities implemented by the given device;

modeling each model entity corresponding to a lowest level of the hierarchy-based model as a respective Boolean function and encoding the respective Boolean function as a respective BDD;

generating BDDs for each successively higher level of the hierarchy- based model by, for a given hierarchy level:

generating a BDD representing a given model entity at the given hierarchy level by logically combining BDDs representing one or more lower level model entities implemented by the given model entity, the one or more lower level model entities belonging to a lower hierarchy level immediately below the given hierarchy level;

wherein each BDD representing a respective lower level model entity is conjugated with a respective index variable indicating a logical order of the respective lower level model entity implemented by the given model entity; and storing the BDDs for each hierarchy level.

* * * * *

UNITED STATES PATENT AND TRADEMARK OFFICE
CERTIFICATE OF CORRECTION

| | | |
|---|---|---|
| PATENT NO. | : 11,516,089 B2 | |
| APPLICATION NO. | : 17/080112 | |
| DATED | : November 29, 2022 | |
| INVENTOR(S) | : Ashkan Sobhani and Xingjun Chu | |

It is certified that error appears in the above-identified patent and that said Letters Patent is hereby corrected as shown below:

In the Claims

In Column 22, Line 28 (Claim 8): "is represented by a respective individual hierarchy-based" should read --is represented by a respective individual hierarchy-based model--.

Signed and Sealed this
Fourteenth Day of February, 2023

Katherine Kelly Vidal
*Director of the United States Patent and Trademark Office*